(12) United States Patent
Kim et al.

(10) Patent No.: US 11,773,233 B2
(45) Date of Patent: Oct. 3, 2023

(54) CARBON COMPOSITE MATERIAL AND METHOD FOR PRODUCING SAME

(71) Applicant: LG CHEM, LTD., Seoul (KR)

(72) Inventors: Seokwon Kim, Daejeon (KR); Se Hyun Kim, Daejeon (KR); Tae Hyung Kim, Daejeon (KR); Pyeong-Gi Kim, Daejeon (KR); Suk Jo Choi, Daejeon (KR); Dong Hyun Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/743,437

(22) PCT Filed: Oct. 17, 2016

(86) PCT No.: PCT/KR2016/011651
§ 371 (c)(1),
(2) Date: Jan. 10, 2018

(87) PCT Pub. No.: WO2017/146340
PCT Pub. Date: Aug. 31, 2017

(65) Prior Publication Data
US 2018/0201751 A1    Jul. 19, 2018

(30) Foreign Application Priority Data
Feb. 26, 2016 (KR) .................. 10-2016-0022910

(51) Int. Cl.
| | |
|---|---|
| *C08K 3/016* | (2018.01) |
| *C01B 32/168* | (2017.01) |
| *C07F 9/09* | (2006.01) |
| *C08K 3/40* | (2006.01) |
| *C08K 7/02* | (2006.01) |
| *C08L 101/00* | (2006.01) |
| *C08K 3/04* | (2006.01) |
| *C08J 5/04* | (2006.01) |
| *C08K 7/14* | (2006.01) |
| *C07F 9/12* | (2006.01) |
| *C08K 5/521* | (2006.01) |

(52) U.S. Cl.
CPC ............ *C08K 3/016* (2018.01); *C01B 32/168* (2017.08); *C07F 9/09* (2013.01); *C07F 9/12* (2013.01); *C08J 5/047* (2013.01); *C08K 3/041* (2017.05); *C08K 3/045* (2017.05); *C08K 3/40* (2013.01); *C08K 5/521* (2013.01); *C08K 7/02* (2013.01); *C08K 7/14* (2013.01); *C08L 101/00* (2013.01); *C01B 2202/02* (2013.01); *C01B 2202/06* (2013.01); *C01B 2202/26* (2013.01); *C01B 2202/34* (2013.01); *C01B 2202/36* (2013.01); *C01B 2204/26* (2013.01); *C01B 2204/32* (2013.01); *C08J 5/042* (2013.01); *C08J 5/043* (2013.01)

(58) Field of Classification Search
None
See application file for complete search history.

(56) References Cited

U.S. PATENT DOCUMENTS

| | | | |
|---|---|---|---|
| 7,307,120 B2 | 12/2007 | Nodera | |
| 8,044,127 B2 | 10/2011 | Nodera | |
| 2006/0089434 A1* | 4/2006 | Nodera | B82Y 30/00 524/115 |
| 2008/0176088 A1* | 7/2008 | Elia | B29C 45/0013 428/454 |
| 2008/0176978 A1 | 7/2008 | Nodera | |
| 2011/0168942 A1 | 7/2011 | Hitoe et al. | |
| 2011/0193031 A1* | 8/2011 | Kolditz | C08L 23/0861 252/511 |
| 2012/0053288 A1* | 3/2012 | Morishita | B82Y 30/00 524/547 |
| 2013/0137822 A1* | 5/2013 | Guan | B82Y 30/00 525/74 |
| 2014/0187702 A1 | 7/2014 | Lee et al. | |
| 2014/0193323 A1 | 7/2014 | Youm et al. | |
| 2015/0018490 A1* | 1/2015 | Takagiwa | C08F 120/06 525/327.4 |
| 2015/0322260 A1 | 11/2015 | Chin et al. | |
| 2016/0247594 A1* | 8/2016 | Nakai | C08L 77/02 |
| 2016/0263840 A1 | 9/2016 | Choi et al. | |
| 2017/0158935 A1* | 6/2017 | Koh | C09D 7/70 |

FOREIGN PATENT DOCUMENTS

| | | | |
|---|---|---|---|
| CN | 102099287 A | | 6/2011 |
| CN | 104995245 A | | 10/2015 |
| EP | 1471114 A1 | | 10/2004 |
| JP | 2004182842 A | * | 7/2004 |

(Continued)

OTHER PUBLICATIONS

Yu et al. Strength and Breaking Mechanism of Multiwalled Carbon Nanotubes Under Tensile Load. Science vol. 287 (Year: 2000).*
NC7000 Technical Data Sheet (Year: 2016).*
Wu, et al. 2013.Electrical and flame-retardant properties of carbon nanotube/poly(ethylene terephthalate) composites containing bisphenol A bis(diphenyl phosphate).Polymer 54. pp. 3334-3340.

(Continued)

*Primary Examiner* — Tanisha Diggs
(74) *Attorney, Agent, or Firm* — BRYAN CAVE LEIGHTON PAISNER LLP

(57) ABSTRACT

The present invention relates to a carbon composite material and a method for producing the same, and more particularly, to a carbon composite material capable of improving electrostatic dispersibility and flame retardancy, and a method for producing the same. The carbon composite material according to the present invention can be effectively applied to products requiring conductivity and flame retardancy.

28 Claims, 1 Drawing Sheet

(56) References Cited

FOREIGN PATENT DOCUMENTS

| JP | 3892389 B2 | 3/2007 | | |
|---|---|---|---|---|
| JP | 2015-020939 A | 2/2015 | | |
| KR | 10-2011-0031494 A | 3/2011 | | |
| KR | 10-2012-0078469 A | 7/2012 | | |
| KR | 10-2015-0066209 A | 6/2015 | | |
| WO | WO-2013013070 A2 * | 1/2013 | ............... | C08J 5/10 |
| WO | 2013/066105 A1 | 5/2013 | | |

OTHER PUBLICATIONS

"Flame Retardant Plastics Brochure", edited by Ou Yuxiang, Beijing: National Defense Industry Press, Jan. 31, 2008, pp. 651-652.

* cited by examiner

[Fig. 1]
Polymer Matrix Distribution of Carbon Fibers
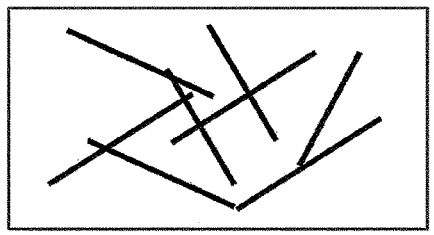
Polymer Matrix Distribution of Carbon Nanotubes
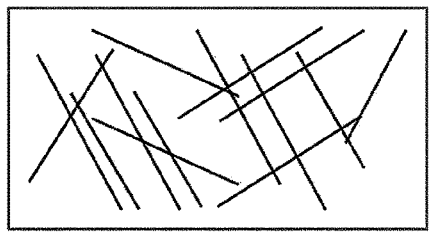
[Fig. 2]
The distribution of the surface resistance of Comparative Example 3
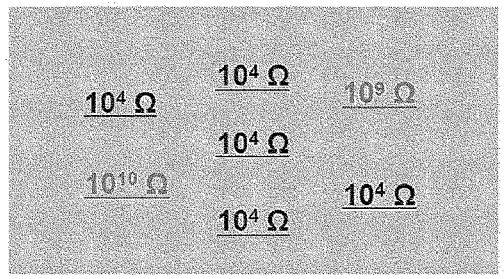
The distribution of the surface resistance of Example 2
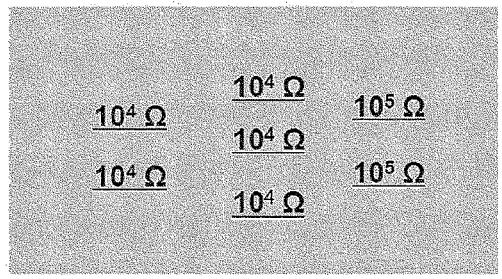
[Fig. 3]
Comparative Example 3  Appearance of composite material
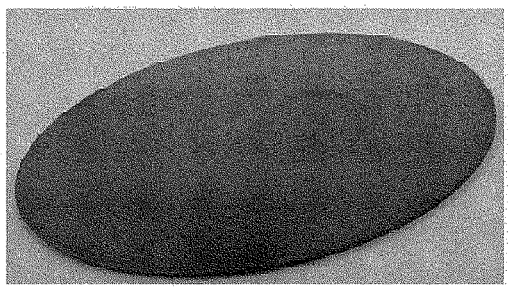
Example 2  Appearance of composite material
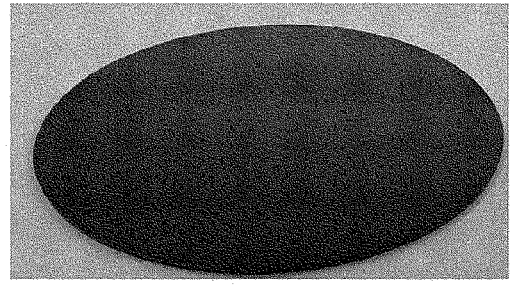

CARBON COMPOSITE MATERIAL AND METHOD FOR PRODUCING SAME

This application is a National Stage Entry of International Application No. PCT/KR2016/011651 filed on Oct. 17, 2016, and claims the benefit of Korean Application No. 10-2016-0022910, filed on Feb. 26, 2016, all of which are hereby incorporated by reference in their entirety for all purposes as if fully set forth herein.

BACKGROUND OF THE INVENTION

1. Field of the Invention

This application claims the benefit of priority to Korean Patent Application No. 10-2016-0022910, filed on Feb. 26, 2016, the entire disclosure of which is incorporated herein by reference.

The present invention relates to a carbon composite material and a method for producing the same, and more particularly, to a carbon composite material capable of improving physical properties such as electrostatic dispersibility and flame retardancy, and a method for producing the same.

2. Description of the Related Art

In recent years, as the demand for smart products and the like has increased, there is an increasing interest in products having high electrical conductivity and materials for preventing static electricity accumulation, in order to prevent damage and mutual interference of products.

In addition, miniaturization and high integration, high performance, and light weight of the products have been achieved, and accordingly, there is an increasing interest in carbon composite materials for improving mechanical properties and electrical properties.

Carbon nanotubes (CNTs), which are a kind of carbon isotopes, have a diameter of several to several tens of nanometers and are several hundreds of micrometers to several millimeters in length. They have been reported in the journal Nature in 1991 by Dr. Iijima and have been studied in a variety of fields due to their excellent thermal, electrical and physical properties and high aspect ratio. The inherent characteristics of such carbon nanotubes are attributed to the sp2 bond of carbon and the carbon nanotubes are stronger than iron, are lighter than aluminum, and exhibit electrical conductivity similar to that of metals. The carbon nanotubes can be classified into a single-wall carbon nanotube (SWNT), a double-wall carbon nanotube (DWNT) and a multi-walled carbon nanotube (MWNT) according to the number of walls of the nanotubes, and can be divided into zigzag, armchair, and chiral structures according to the asymmetry/chirality.

Carbon nanotubes can be applied to display devices in information communication technology field, integrated memory devices, secondary batteries and super capacitors, hydrogen storage materials, chemical sensors, high strength/light-weight composites, static eliminating composites and electromagnetic wave shielding (EMI/RFI shielding) materials and have the possibility of exceeding the limit of existing devices. Thus, they are still being studied.

In the case of a composite material in which a carbon material is used as a reinforcing material, it is difficult to sufficiently exhibit the excellent properties of the carbon material.

Conventionally, a composite material generally contains a carbon black or a carbon fiber as a filler in a polymer resin having an insulating property in order to increase the conductivity. However, there are problems that the deviation of conductivity is partially generated and the gloss characteristic is not good so that there is a drawback that the application to the appearance of the product is limited.

In order to solve the above problems, the use of carbon nanotubes can improve the deviation of conductivity and the gloss characteristics, but may also cause a problem of deteriorating the flame retardancy.

Therefore, research on composites for improving both of electrostatic dispersibility and flame retardant properties is required.

An object of the present invention is to provide a carbon composite material capable of improving both of electrostatic dispersibility and flame retardancy.

Another object of the present invention is to provide a method for producing a carbon composite material.

In order to solve the above problems, the present invention provides a carbon composite material comprising:
 a polymer resin;
 a carbon nanotube;
 a glass fiber; and
 a phosphate ester derivative,
wherein the carbon nanotube has a thermal decomposition temperature of 550° C. or higher.

According to one embodiment, the polymer resin may be a thermoplastic resin.

The polymer resin may be at least one selected from the group consisting of a nylon resin, a polyethylene resin, a polyamide resin, a polyester resin, a polycarbonate resin, a polyarylate resin and a cyclopolyolefin resin.

According to one embodiment, an average length of the carbon nanotube may be 0.1 to 500 μm.

The maximum length of the carbon nanotube may be 1000 μm.

An average diameter of the carbon nanotube may be 0.1 to 100 nm.

According to one embodiment, an aspect ratio of the carbon nanotube is 500 to 5000 and it can be calculated according to the following equation (1).

$$\text{Aspect ratio} = \text{Length}\ (L)/\text{Diameter}\ (D) \quad \text{[Equation 1]}$$

According to one embodiment, the carbon nanotube may comprise a single-wall carbon nanotube, a multi-wall carbon nanotube, or a combination thereof.

According to one embodiment, the carbon nanotube may be in the form of a rigid random coil.

According to one embodiment, the phosphate ester derivative may be at least one selected from the group consisting of phosphine-based, phosphine oxide-based, and a mixture thereof.

The phosphate ester derivative may be at least one selected from the group consisting of trialkyl ester, dialkyl ester and monoalkyl ester.

According to one embodiment, an average length of the glass fiber may be 1 mm to 10 mm.

According to one embodiment, the carbon composite material of the present invention may have a tensile strength of 1,050 kg/cm² or more and a thermal deformation temperature of 95° C. or more.

Further, the ratio of the maximum value to the minimum value of distribution of the surface resistance may be $1 \times 10^2$ or less.

According to another aspect of the present invention, there is provided a method for producing a carbon composite material, comprising the step of mixing a polymer resin;
a carbon nanotube;
a glass fiber; and
a phosphate ester derivative,
wherein the carbon nanotube has an aspect ratio of 500 to 5000 and a thermal decomposition temperature of 550° C. or higher.

According to one embodiment, the method may further comprise the step selected from melting, extrusion, molding, or a combination thereof.

Also, according to one embodiment, a molded article comprising the carbon composite material as described above can be provided.

Other details of the embodiments of the present invention are described in the following detailed description.

Effects of the Invention

The carbon composite material according to the present invention can uniformly disperse static electricity and improve flame retardancy, so that the carbon composite material can be effectively applied to products requiring conductivity and flame retardancy.

BRIEF DESCRIPTION OF THE DRAWINGS

FIG. 1 is a schematic view of the carbon composite material.

FIG. 2 is a schematic view of the distribution of the surface resistance of the composite material.

FIG. 3 is a photo of appearance of the composite material.

DETAILED DESCRIPTION OF THE INVENTION

The present invention is capable of various modifications and various embodiments, and specific embodiments are illustrated in the drawings and described in detail in the description. It should be understood, however, that the invention is not intended to be limited to the particular embodiments, but includes all modifications, equivalents, and alternatives falling within the spirit and scope of the invention. In describing the present invention, a detailed description of related arts will be omitted if it is determined that the gist of the present invention may be blurred.

The term "composite material" as used herein may be used interchangeably with "composite" and may be understood to mean a material formed by combining two or more materials.

Further, the term "molding" as used herein may be described interchangeably with "processing" and may be understood to form a desired shape by applying heat or pressure.

Recently, carbon materials are attracting attention as nanocomposites and various electronic materials due to their excellent electrical and optical properties. However, the conventional materials including carbon black, carbon fiber, and the like have a problem of deviation of conductivity. In case that carbon nanotubes (CNTs) are used to improve this problem, there is a disadvantage in that they are accompanied by a secondary problem of deteriorating the flame retardancy.

In order to solve the above problems, a carbon composite material according to an embodiment of the present invention and a method of manufacturing the carbon composite material will be described in detail.

The carbon composite material according to the present invention comprises a polymer resin;

a carbon nanotube;
a glass fiber; and
a phosphate ester derivative,
wherein the carbon nanotube has a thermal decomposition temperature of 550° C. or higher.

By using carbon nanotubes having a thermal decomposition temperature of 550° C. or higher, it is possible to enhance the flame retardancy while distributing the deviation of conductivity of the carbon composite material evenly. Specifically, by using the carbon nanotubes having high thermal stability as described above in order to increase the heat resistance, the content of the flame retardant can be reduced.

Carbon nanotubes having a thermal decomposition temperature of 550° C. or higher are commercially available or can be manufactured at a synthesis temperature of 800° C. or higher, for example, 800 to 1000° C., for example, 800 to 900° C. In addition, the carbon nanotubes can be manufactured by methods including but not limited thereto, for example, arc discharge, laser ablation, pyrolysis, flame synthesis, chemical vapor deposition (CVD), vapor phase growth method, or the like.

The polymer resin may be, for example, a thermoplastic resin and may comprise, for example, at least one selected from the group consisting of a nylon resin, a polyethylene resin, a polyamide resin, a polyester resin, a polycarbonate resin, a polyarylate resin and a cyclopolyolefin resin.

Specific examples of the thermoplastic resin include a polycarbonate resin, a polypropylene resin, a polyamide resin, an aramid resin, an aromatic polyester resin, a polyolefin resin, a polyester carbonate resin, a polyphenylene ether resin, a polyphenylenesulfide resin, a polysulfone resin, a polyether sulfone resin, a polyarylene resin, a cycloolefin-based resin, a polyetherimide resin, a polyacetal resin, a polyvinyl acetal resin, a polyketone resin, a polyether ketone resin, a polyether ether ketone resin, a polyaryl ketone resin, a polyether nitrile resin, a liquid crystal resin, a polybenzimidazole resin, a polyparabanic acid resin, a vinyl-based polymer or copolymer resin obtained by polymerizing or copolymerizing at least one vinyl monomer selected from the group consisting of an aromatic alkenyl compound, methacrylic ester, acrylic ester and a vinyl cyanide compound, a copolymer resin of diene and an aromatic alkenyl compound, a copolymer resin of vinyl cyanide, diene and an aromatic alkenyl compound, a copolymer resin of an aromatic alkenyl compound, diene, vinyl cyanide and N-phenylmaleimide, a copolymer resin of vinyl cyanide, ethylene-diene-propylene (EPDM) and an aromatic alkenyl compound, polyolefin, a vinyl chloride resin, and a chlorinated vinyl chloride resin. The specific types of these resins are well known in the art and can be suitably selected by those skilled in the art.

The polyolefin resin may be, for example, polypropylene, polyethylene, polybutylene, and poly(4-methyl-1-pentene), and combinations thereof, but is not limited thereto. In one embodiment, the polyolefin may be selected from the group consisting of a polypropylene homopolymer (e.g., atactic polypropylene, isotactic polypropylene, and syndiotactic polypropylene), a polypropylene copolymer (e.g., a polypropylene random copolymer), and mixtures thereof. Suitable polypropylene copolymer include, but is not limited to, a random copolymer prepared from the polymerization of propylene in the presence of comonomers selected from the group consisting of ethylene, but-1-ene (i.e., butene), and hex-1-ene (i.e., 1-hexene). In such a polypropylene random copolymer, the comonomers may be present in any suitable amount, but are typically present in an amount of up to about 10 wt % (e.g., from about 1 to about 7 wt %, or from about 1 to about 4.5 wt %).

The polyester resin may be a homopolyester or a polyester copolymer which is a polycondensation product of a component having a dicarboxylic acid skeleton and a component having a diol skeleton. Examples of the homopolyester include polyethylene terephthalate, polypropylene terephthalate, polybutylene terephthalate, polyethylene-2,6-naphthalate, poly-1,4-cyclohexanedimethylene terephthalate, polyethylene diphenylate, and the like. Particularly, since polyethylene terephthalate is inexpensive, it can be used in a wide variety of applications, which is preferable. The polyester copolymer may be defined as a polycondensate comprising at least three or more components selected from the component having the dicarboxylic acid skeleton and the component having the diol skeleton, as illustrated below. Examples of the component having the dicarboxylic acid skeleton include terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenylsulfone dicarboxylic acid, adipic acid, sebacic acid, dimeric acid, cyclohexanedicarboxylic acid and ester derivatives thereof, and the like. Examples of the component having the glycol skeleton include ethylene glycol, 1,2-propanediol, 1,3-butanediol, 1,4-butanediol, 1,5-pentanedial, diethylene glycol, polyalkylene glycol, 2,2-bis(4'-β-hydroxyethoxyphenyl) propane, isosorbate, 1,4-cyclohexanedimethanol, spiroglycol and the like.

As the polyamide resin, a nylon resin, a nylon copolymer resin and mixtures thereof can be used. As the nylon resin, polyamide-6 (nylon 6) obtained by ring-opening polymerization of commonly known lactams such as ε-caprolactam, ω-dodecalactam, and the like; a nylon polymer obtained from amino acids such as aminocaproic acid, 11-amino undecanoic acid, 12-aminododecanoic acid, and the like; a nylon polymer obtainable from the polymerization of aliphatic, alicyclic or aromatic diamines such as ethylenediamine, tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonahexamethylenediamine, metaxylenediamine, paraxylenediamine, 1,3-bisaminomethyl cyclohexane, 1,4-bisaminomethylcyclohexane, 1-amino-3-aminomethyl-3,5,5-trimethylcyclohexane, bis(4-aminocyclohexane), 1 ethane, bis(4-methyl-4-aminocyclohexyl) methane, 2,2-bis(4-aminocyclohexyl)propane, bis (aminopropyl) piperazine, aminoethylpiperidine and the like, and aliphatic, alicyclic or aromatic dicarboxylic acids such as adipic acid, sebacic acid, azelaic acid, terephthalic acid, 2-chloroterephthalic acid, 2-methylterephthalic acid and the like; and copolymers or mixtures thereof can be exemplified. Examples of the nylon copolymer include a copolymer of polycaprolactam (nylon 6) and polyhexamethylene cebacamide (nylon 6,10), a copolymer of polycaprolactam (nylon 6) and polyhexamethylene adipamide (nylon 66), copolymers of polycaprolactam (nylon 6) and polylauryl lactam (nylon 12) and the like.

The polycarbonate resin may be prepared by reacting a diphenol with phosgene, halogen formate, carbonic ester, or a combination thereof. The specific examples of the diphenol include hydroquinone, resorcinol, 4,4'-dihydroxydiphenyl, 2,2-bis(4-hydroxyphenyl)propane (also referred to as 'bisphenol-A'), 2,4-bis(4-hydroxyphenyl)-2-methylbutane, bis(4-hydroxyphenyl)methane, 1,1-bis(4-hydroxyphenyl) cyclohexane, 2,2-bis(3-chloro-4-hydroxyphenyl)propane, 2,2-bis(3,5-dimethyl-4-hydroxyphenyl)propane, 2,2-bis(3, 5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, etc. Among them, for example, 2,2-bis(4-hydroxyphenyl) propane, 2,2-bis(3,5-dichloro-4-hydroxyphenyl)propane or 1,1-bis(4-hydroxyphenyl)cyclohexane can be used, and more specifically 2,2-bis(4-hydroxyphenyl)propane can be used The polycarbonate resin may be a mixture of copolymers prepared from two or more diphenols. In addition, the polycarbonate resin may include a linear polycarbonate resin, a branched polycarbonate resin, a polyester carbonate copolymer resin, and the like.

Examples of the linear polycarbonate resin include a bisphenol-A polycarbonate resin and the like. Examples of the branched polycarbonate resin include those prepared by reacting a polyfunctional aromatic compound such as trimellitic anhydride, trimellitic acid and the like with a diphenol and a carbonate. The polyfunctional aromatic compound may be contained in an amount of 0.05 to 2 mol % based on the total amount of the branched polycarbonate resin. Examples of the polyester carbonate copolymer resin include those prepared by reacting a bifunctional carboxylic acid with a diphenol and a carbonate. Examples of the carbonate include diaryl carbonate such as diphenyl carbonate, ethylene carbonate and the like.

Examples of the cycloolefin-based polymer include a norbornene polymer, a monocyclic olefin-based polymer, a cyclic conjugated diene-based polymer, a vinyl alicyclic hydrocarbon polymer, and hydrides thereof. Specific examples thereof include APEL (an ethylene-cycloolefin copolymer manufactured by Mitsui Chemicals, Inc.), ATON (a norbornene-based polymer manufactured by JSR Corporation), and Zeonoa (a norbornene-based polymer manufactured by Nippon Zeon).

According to one embodiment, among the said polymeric resins, especially, at least one of polycarbonate, polyacrylonitrile-butadiene-styrene, polyester carbonate, polypropylene and polyolefin may be used.

According to one embodiment, the number average molecular weight (Mn) of the polymer resin may be from 15,000 to 100,000, for example from 20,000 to 80,000 or from 20,000 to 50,000. Within the above range, the present invention can provide a carbon composite material having improved viscosity and flame retardancy.

The carbon composite material according to the present invention includes carbon nanotubes as a main component instead of carbon fibers, thereby facilitating formation of network between the compositions of the carbon composite material. Specifically, as shown in FIG. 1, the carbon nanotubes in the carbon composite material form more networks than the carbon fibers, thereby reducing deviation of surface resistance and exhibiting uniform electrical properties.

According to one embodiment, the carbon nanotubes having the average length of 0.1 to 500 μm may be used. Specifically, for example, it may comprise carbon nanotubes having the average length of 1 to 300 μm, for example 1 to 100 μm, for example 10 to 50 μm. When the average length of the carbon nanotubes is less than 0.1 μm, the molding may not be easy, and when the average length exceeds 500 μm, the thermal conductivity may increase.

In addition, the maximum length of the carbon nanotubes may be 1000 μm, and the carbon material having the maximum length may be included in an amount of not more than 20 wt % and for example 10 wt % or less based on the total weight of the carbon nanotubes.

According to one embodiment, the carbon nanotubes may have the average diameter of 0.1 to 100 nm. Specifically, for example, it may comprise carbon nanotubes having the average diameter of 0.1 to 50 nm, for example 1 to 30 nm. When the average diameter of the carbon nanotubes is less than 0.1 nm, the rate of increase of the thermal conductivity may be increased, and when it is more than 100 nm, the dispersibility may be deteriorated.

The maximum diameter of the carbon nanotubes may be 1000 nm. The carbon nanotubes having the maximum diameter may be included in an amount of not more than 10 parts by weight and for example 5 parts by weight or less based on the total weight of the carbon nanotubes.

The aspect ratio of the carbon nanotube can be calculated according to the following Equation (1).

$$\text{Aspect ratio} = \text{Length } (L)/\text{Diameter } (D) \quad [\text{Equation 1}]$$

According to one embodiment, the aspect ratio of the carbon nanotube according to Equation (1) may be 500 to 5000. Specifically, for example, it may comprise carbon nanotubes having the aspect ratio of 500 to 3000, for example 1000 to 3000.

The carbon nanotubes may be cut and controlled in length, if necessary. In this case, a low temperature process can be used. The low temperature process may be performed at a temperature of 0° C. or lower, for example 0° C. to −100° C. For example, cutting of the carbon nanotubes may be performed in the above temperature range.

The carbon nanotube used in the present invention may comprise a single-wall carbon nanotube, a multi-wall carbon nanotube, or a combination thereof. Specifically, the carbon nanotube may comprise a single-wall carbon nanotube (SWCNT) composed of one layer and having a diameter of about 1 nm, a double-wall carbon nanotube (DWCNT) composed of two layers and having a diameter of about 1.4 to 3 nm, and a multi-wall carbon nanotube (MWCNT) composed of a plurality of three or more layers and having a diameter of about 5 to 100 nm.

According to one embodiment, the shape of the carbon nanotubes may comprise one or more selected from the group consisting of zigzag, armchair and chiral structures depending on the asymmetry/chirality, for example.

According to the Dresselhaus notation, the structure of carbon nanotubes can be classified according to the following Equation (2).

[Equation 2]

$$Ch = na1 + ma2 \quad (2)$$

wherein, a1 and a2 are basis vectors of unit cell of the graphene plane, and n≥m.

In the Equation (2) according to the Dresselhaus notation, when m=0 it represents a zigzag structure, and when n=m it represents an armchair structure. Otherwise, it can be defined as carbon nanotube having a chiral structure. The two structures of the zigzag structure and the armchair structure can be symmetrical, and the chiral structure has a structure in which honeycomb-shaped hexagons are arranged spirally along the tube axis.

According to one embodiment, the carbon nanotubes may be in the form of a rigid random coil, for example. The carbon nanotubes of the rigid random coil form have an effective bending modulus that is larger than the thermal energy (kT, where k is a Boltzmann constant and T is an absolute temperature) so that elastic deformation due to thermal energy does not occur within the expanded length of the particles used, and it can be defined as the carbon nanotubes in which the total size of the particles (distance between ends) is linearly proportional to square root of an apparent molecular weight.

According to one embodiment, if the content of the carbon nanotube is excessive, the moldability may be deteriorated, and if the content of the carbon nanotubes is small, the physical properties such as durability may be lowered. Therefore, it may be 0.001 to 30% by weight, for example from 0.01 to 20% by weight, for example from 0.1 to 10% by weight.

According to one embodiment, the phosphate ester derivative may include at least one selected from the group consisting of phosphine-based, phosphine oxide-based, and a mixture thereof. For example, the phosphate ester derivative may comprise at least one selected from the group consisting of trialkyl ester, dialkyl ester, and monoalkyl ester. Moreover, it may further comprise at least one selected from the group consisting of triphenyl phosphate, triphenylphosphine oxide and cyclic phenoxyphosphagene together with said phosphate ester derivative.

According to one embodiment, the content ratio of the carbon nanotube to the phosphate ester may be 1:3 to 15 by weight, for example, in the range of 1:5 to 10 to improve the physical properties of the carbon composite material.

According to one embodiment, the average length of the glass fiber can be from 1 to 10 mm, and for example, in the range of from 3 to 8 mm, the strength and moldability can be improved without affecting the mixing between the respective components in the carbon composite material.

According to one embodiment, the carbon composite material according to the present invention may have a tensile strength of 1,050 kg/cm$^2$ or more and a thermal deformation temperature of 95° C. or more. Further, the ratio of the maximum value to the minimum value of distribution of the surface resistance may be 1×10$^2$ or less.

According to one embodiment of the present invention, there is provided a method for producing the carbon composite material, comprising the step of mixing a polymer resin;
a carbon nanotube;
a glass fiber; and
a phosphate ester derivative, wherein the carbon nanotube has an aspect ratio of 500 to 5000 and a thermal decomposition temperature of 550° C. or higher.

According to one embodiment, the manufacturing method may further comprise the step selected from melting, extrusion, molding, or a combination thereof, but is not limited thereto. Specifically, the carbon composite material can be melted, mixed and extruded in an extruder. The type of the extruder may be a commonly used a twin screw extruder, and it is not limited to the above as long as it is commonly used.

According to one embodiment, the carbon composite material can be applied to products requiring conductivity and flame retardancy through molding, for example, by extrusion, injection, or extrusion and injection. It can be suitably selected as long as it is a conventional method in the art, and is not limited to the above description.

The present invention will be explained in more detail with reference to the following examples, including comparative examples. However, these examples are provided for illustrative purposes only and are not intended to limit the scope of the invention.

Examples and Comparative Examples: Production of Carbon Composite Material

Carbon composite materials of Examples 1 to 2 and Comparative Examples 1 to 3 were prepared with the compositions shown in Table 1 below.

As the polycarbonate, LUPOY 1300-30 from LG Chemical Co., Ltd. was used.

The carbon fiber was a chopped fiber (Zoltek) having a diameter of 1 to 30 μm and a length of 6 mm or more.

The carbon nanotube used in the example was prepared by chemical vapor deposition at a reaction temperature of about 900° C.

The carbon nanotube was prepared by chemical vapor deposition at a reaction temperature of 600 to 800° C., with a thermal decomposition temperature of 500° C. or less.

The carbon fiber was a chopped fiber having a length of 6 mm.

The glass fiber having a diameter of 10 to 13 μm and a length of 6 mm manufactured by Owens Corning was used.

BPADP FP-600 from ADEKA was used as phosphate ester.

The unit of the content is % by weight based on the total weight of the composition.

TABLE 1

|  |  | Example 1 | Example 2 | Comparative Example 1 | Comparative Example 2 | Comparative Example 3 |
|---|---|---|---|---|---|---|
| Content of polycarbonate | | 70.5 | 70 | 67.5 | 67 | 85 |
| Content of carbon fiber (length: 6 mm) | | — | — | — | — | 10 |
| Carbon nanotube | Content | 1.5 | 2 | 1.5 | 2 | — |
| | Length | 20 μm | 20 μm | 1.5 μm | 1.5 μm | — |
| | Diameter(nm) | 10 | 10 | 10 | 10 | — |
| | Thermal decomposition temperature (° C.) | 600 or more | 600 or more | 500 or less | 500 or less | — |
| Content of glass fiber (length: 6 mm) | | 15 | 15 | 15 | 15 | — |
| Content of phosphate ester | | 13 | 13 | 16 | 16 | 5 |

Manufacturing Example: Preparation of Specimen

The components in the amounts shown in Table 1 were added to a twin-screw extruder (L/D=42, φ=40 mm) and melt extruded while increasing the temperature profile to 280° C. to prepare pellets. The prepared pellets were extruded from the extruder under the condition of a flat profile at an injection temperature of 280° C. to prepare specimens conforming to the specification of each experimental example, including specimens having a thickness of 3.2 mm, a length of 12.7 mm and a dog-bone shape.

FIG. 3 shows specimens produced from composite materials according to Example 2 and Comparative Example 3.

Experimental Example: Characterization of Carbon Composite Material

Experimental Example 1

For each of the specimens according to the Examples and Comparative Examples, tensile strength was measured by the method according to ASTM D638.

Experimental Example 2

For each of the specimens according to the Examples and Comparative Examples, flexural strength was measured by the method according to ASTM D790.

Experimental Example 3

For each of the specimens according to the Examples and Comparative Examples, flexural elasticity was measured by the method according to ASTM D790.

Experimental Example 4

For each of the specimens according to the Examples and Comparative Examples, impact strength was measured by the method according to ASTM D256.

Experimental Example 5

For each of the specimens according to the Examples and Comparative Examples, surface resistance was measured by the method according to ASTM D257.

Experimental Example 6

For each of the specimens according to the Examples and Comparative Examples, flame retardant characteristics were measured by a method according to the UL (UnderWriter's Laboratory) standard UL V-94 (Vertical Burning, V) test method, and then the grade was determined according to the classification criteria.

Experimental Example 7

For each of the specimens according to the Examples and Comparative Examples, the thermal deformation temperature was measured by a method according to ASTM D648.

The results of the above experimental examples are shown in Table 2 below.

TABLE 2

|  | Example 1 | Example 2 | Comparative Example 1 | Comparative Example 2 | Comparative Example 3 |
|---|---|---|---|---|---|
| Tensile strength (kg/cm$^2$) | 1,090 | 1,120 | 1,080 | 1,100 | 1,070 |
| Flexural strength (kg/cm$^2$) | 1,510 | 1,520 | 1,550 | 1,590 | 1,580 |
| Flexural elasticity (kg/cm$^2$) | 59,000 | 60,000 | 61,000 | 62,000 | 76,000 |
| Impact strength (kg · cm/cm) | 5 | 5 | 4 | 4 | 4 |
| Surface resistance (ohm/sq) | $10^7$~$10^8$ | $10^4$~$10^5$ | $10^7$~$10^8$ | $10^4$~$10^5$ | $10^4$~$10^{10}$ |
| Flame retardant characteristics (UL V-94) | V-1 | V-1 | V-1 | V-1 | V-1 |
| Thermal deformation temperature (HDT, ° C.) | 98° C. | 98° C. | 90° C. | 90° C. | 120° C. |

The distributions of the surface resistance according to Example 2 and Comparative Example 3 in Table 2 are shown in FIG. 2.

As shown in Tables 1 and 2, in Examples 1 and 2 in which carbon nanotubes have a relatively high thermal decomposition temperature, the content of phosphate ester was lower compared to Comparative Examples 1 and 2 in which carbon nanotubes have relatively low thermal decomposition temperature, while the thermal deformation temperature was further increased by 8° C.

In the case of Comparative Example 3, the thermal deflection temperature was increased while the content of phosphate ester was low. However, as shown in FIG. 2, the distribution of the surface resistance values is not uniform so that the deviation is large and the ratio of the maximum value to the minimum value is 1×10$^6$.

On the other hand, in Examples 1 and 2, the ratio of the maximum value to the minimum value of the surface resistance is 1×10, and the ratio is 10$^5$ times smaller than that of Comparative Example 3.

Therefore, it can be confirmed that the carbon composite material according to the present invention can uniformly distribute the surface resistance and increase the thermal deformation temperature.

While specific embodiments of the invention have been described in detail, it will be appreciated by those skilled in the art that such detailed descriptions are merely preferred embodiments and the scope of the present invention is not limited thereto. Therefore, the true scope of the present invention should be defined by the appended claims and their equivalents.

What is claimed is:

1. A carbon composite material in the form of a mixture comprising:
   a polymer resin;
   a carbon nanotube dispersed in the mixture;
   a glass fiber; and
   a phosphate ester derivative,
   wherein the carbon nanotube has a thermal decomposition temperature of 600° C. or higher, and wherein a ratio of the weight of carbon nanotube to the weight of phosphate ester derivative present in the carbon composite material is 1:3-15, and
   wherein the carbon composite material has a surface resistance of 10$^4$-10$^8$ ohm/sq;
   wherein a ratio of the maximum value to the minimum value of the surface resistance, as measured according to ASTM D257, of the composite material is 1×10$^2$ or less.

2. The carbon composite material according to claim 1, wherein the polymer resin is a thermoplastic resin.

3. The carbon composite material according to claim 1, wherein the polymer resin is at least one selected from the group consisting of a nylon resin, a polyethylene resin, a polyamide resin, a polyester resin, a polycarbonate resin, a polyarylate resin and a cyclopolyolefin resin.

4. The carbon composite material according to claim 1, wherein an average length of the carbon nanotube is 0.1 to 500 μm.

5. The carbon composite material according to claim 1, wherein a maximum length of the carbon nanotube is 1000 μm.

6. The carbon composite material according to claim 1, wherein an average diameter of the carbon nanotube is 0.1 to 100 nm.

7. The carbon composite material according to claim 1, wherein an aspect ratio of the carbon nanotube is 500 to 5000 and is calculated according to the following Equation (1)

$$\text{Aspect ratio} = \text{Length } (L)/\text{Diameter } (D) \qquad [\text{Equation 1}].$$

8. The carbon composite material according to claim 1, wherein the carbon nanotube comprises a single-wall carbon nanotube, a multi-wall carbon nanotube, or a combination thereof.

9. The carbon composite material according to claim 1, wherein the carbon nanotube is in the form of a rigid random coil.

10. The carbon composite material according to claim 1, wherein the phosphate ester derivative is at least one selected from the group consisting of phosphine-based, phosphine oxide-based, and mixtures thereof.

11. The carbon composite material according to claim 1, wherein the phosphate ester derivative is at least one selected from the group consisting of trialkyl ester, dialkyl ester and monoalkyl ester.

12. The carbon composite material according to claim 1, wherein an average length of the glass fiber is 1 mm to 10 mm.

13. The carbon composite material according to claim 1, wherein the carbon composite material has a tensile strength of 1,050 kg/cm$^2$ or more.

14. The carbon composite material according to claim 1, wherein the carbon composite material has a thermal deformation temperature of 95° C. or more.

15. The carbon composite material according to claim 1, comprising 0.1 to 2 weight percent of the carbon nanotube.

16. The carbon composite material according to claim 1, wherein the ratio of the maximum value to the minimum value of the surface resistance, as measured according to ASTM D257, of the composite material is 1×10 or less.

17. The carbon composite material according to claim 1, wherein the polymer resin has a number average molecular weight (Mn) of the polymer resin of 15,000 to 100,000.

18. The carbon composite material according to claim 1, wherein the polymer resin is a polycarbonate resin.

19. The carbon composite material according to claim 18, wherein polycarbonate resin is a polycarbonate copolymer.

20. A carbon composite material in the form of a mixture comprising:
   a polymer resin;
   a carbon nanotube dispersed in the mixture;
   a glass fiber; and
   a phosphate ester derivative,
   wherein the carbon nanotube has a thermal decomposition temperature of 600° C. or higher, and wherein a ratio of the weight of carbon nanotube to the weight of phosphate ester derivative present in the carbon composite material is 1:3-15,
   wherein a ratio of the maximum value to the minimum value of the surface resistance, as measured according to ASTM D257, of the composite material is 1×10$^2$ or less, and
   wherein, based on the total weight of the carbon composite material, the content of the carbon nanotuhes is 0.001 to 30% by weight, an average length of the carbon nanotube is 10 to 500 µm, and an aspect ratio of the carbon nanotube is 500 to 5000 and is calculated according to the following Equation (1)

$$\text{Aspect ratio} = \text{Length } (L)/\text{Diameter } (D), \quad [\text{Equation 1}]$$

wherein the carbon composite material has a thermal deformation temperature of 95° C. or more.

21. The carbon composite material according to claim 20, wherein the polymer resin has a number average molecular weight (Mn) of the polymer resin of 15,000 to 100,000.

22. The carbon composite material according to claim 20, wherein the polymer resin is a polycarbonate resin.

23. The carbon composite material according to claim 22, wherein polycarbonate resin is a polycarbonate copolytner.

24. The carbon composite material according to claim 20, comprising 0.1 to 2 weight percent of the carbon nanotube.

25. The carbon composite material according to claim 20, wherein the carbon composite material has a surface resistance of 10$^4$ to 10$^8$ ohm/sq.

26. A molded article comprising the carbon composite material claim 1.

27. A method for producing the carbon composite material according to claim 1, comprising mixing:
   a polymer resin;
   a carbon nanotube;
   a glass fiber; and
   a phosphate ester derivative,
   wherein the carbon nanotube has an aspect ratio of 500 to 5000 and a thermal decomposition temperature of 550 °C or higher.

28. The method according to claim 27 wherein the method further comprises subjecting the mixture to melting, extruding, molding, or a combination thereof.

* * * * *